United States Patent [19]
Hamilton et al.

[11] Patent Number: 5,249,166
[45] Date of Patent: Sep. 28, 1993

[54] OPTICAL DISC AUDIO REPRODUCTION DEVICE HAVING TRACK PLAYBACK MONITORING SYSTEM

[76] Inventors: Rowan T. Hamilton, 22 Hadley St., Cambridge, Mass. 02140; Rebecca E. Hamilton, 6947 Shook Ave., Dallas, Tex. 75214

[21] Appl. No.: 17,698
[22] Filed: Feb. 12, 1993
[51] Int. Cl.$^5$ .......................... G11B 17/22; G11B 3/64
[52] U.S. Cl. .......................... 369/32; 369/85; 369/30; 360/15
[58] Field of Search .......................... 369/32, 84, 85, 30, 369/14, 15, 58, 83, 34; 360/15, 13, 79, 92; 235/419, 449, 454; 352/92, 236; 358/311

[56] References Cited
U.S. PATENT DOCUMENTS

| | | | |
|---|---|---|---|
| 3,990,710 | 11/1976 | Hughes | 369/34 |
| 4,108,365 | 8/1978 | Hughes | 235/419 |
| 4,141,045 | 2/1979 | Sheehan | 360/15 |
| 4,703,465 | 10/1987 | Parker | 369/30 |
| 4,811,325 | 3/1989 | Sharples, Jr. | 369/85 |
| 4,841,506 | 6/1989 | Kiyoura et al. | 369/32 |
| 4,847,708 | 7/1989 | Furuyama | 369/32 |
| 4,916,682 | 4/1990 | Tomoda et al. | 369/32 |
| 4,937,807 | 6/1990 | Weitz et al. | 369/85 |
| 5,080,479 | 1/1992 | Rosenberg | 352/92 |

Primary Examiner—Robert J. Pascal
Assistant Examiner—Ali Neyzari
Attorney, Agent, or Firm—Konneker, Bush & Hitt

[57] ABSTRACT

Apparatus and method for monitoring audio track playbacks by an optical disc audio reproduction device. A track number corresponding to an audio track encoded on an optical disc is selected to initiate playback of the selected audio track and a corresponding track number is stored in a first memory device. A series of data frames, each having an audio data block and a non-audio subcode block containing a single Q data bit, which define the selected audio track are then read from the optical disc. The data frames are transmitted to a demodulator circuit where the non-audio subcode block is separated from the audio data block. The non-audio subcode block is then transmitted to a microprocessor where the single bit of Q data subcode from each frame is assembled into a Q data subcode block. A portion of the Q data subcode block which contains a UPC code identifying the optical disc is transmitted to a second memory device. The contents of the first and second memory device are then combined in a third memory device to provide a record of audio track playbacks performed by the optical disc audio reproduction device.

19 Claims, 2 Drawing Sheets

OPTICAL DISC AUDIO REPRODUCTION DEVICE HAVING TRACK PLAYBACK MONITORING SYSTEM

BACKGROUND OF THE INVENTION

1. Field of the Invention

This invention relates to an optical disc audio reproduction device, commonly referred to as a compact disc (or "CD") player and, more particularly, to a CD player having a track playback monitoring system for providing a record of the tracks played by the CD player.

2. Description of Related Art

Owners and/or operators of audio reproduction devices, particularly those in commercial settings, often need to compile a list of sound recordings replayed by their audio reproduction devices. Once assembled, such lists may be used for a variety of purposes. For example, the assembled listing may be used by a radio station to monitor adherence to the station's "playlist" which identifies sound recordings selected by the station for public broadcast and may also include a rotation frequency indicating how often each of the sound recordings on the playlist should be broadcast. As programming becomes more sophisticated, the playlist may be subdivided into sub-groups of the master list, each sub-group being selected for broadcast at a different frequency. For example, a first sub-group of sound recordings may be scheduled for broadcast 4-6 times a day while a second sub-group is scheduled for broadcast once a day. Thus, as playlists become more sophisticated, the ability to monitor playbacks broadcast by the station becomes of increasing importance.

Another example of an audio reproduction device used in a commercial setting where the ability to monitor the number of playbacks of sound recordings performed by the audio reproduction device desirable is the "juke box". A juke-box is a coin operated, audio reproduction device, typically located in restaurants and bars, in which upon payment of a designated fee, a patron selects, from a list of sound recordings, a particular recording or recordings for playback. By being able to monitor the number of playbacks of each listed sound recording, the owner of the juke box would be able to replace infrequently selected recordings with more popular selections, thereby enhancing revenue generated by the juke box.

One area where the ability to monitor the number of playbacks of sound recordings by a commercial audio reproduction device is particularly useful involves the determination of royalties owed in connection with a reproduction of a copyrighted sound recording. The copyright laws require any person who uses an audio reproduction device to reproduce a copyrighted sound recording, either in a fixed tangible medium or in a public performance or other public broadcast must pay royalties to the owner of the copyrighted sound recording. While some royalty payments may be covered by various compulsory or other licensing arrangements, depending on the circumstances surrounding the reproduction of the copyrighted sound recording, there may still be a need to accurately identify the particular copyrighted sound recordings reproduced by the audio reproduction device in order to calculate the amount of royalties owed to the owners of the sound recordings.

Various audio reproduction devices which permit a consumer to select sound recordings for transfer to a tangible, fixed medium, such as a cassette tape, which is then sold to the consumer, have been disclosed in the art. For example, U.S. Pat. Nos. 3,990,710 to Hughes, 4,108,365 to Hughes, 4,141,045 to Sheehan, 4,703,465 to Parker and 4,811,325 to Sharples, Jr. et al. all disclose various systems for transferring selected sound recordings from a first fixed medium, which, in various ones of the cited references, is alternately disclosed as a record, tape or CD ROM, to a second fixed medium, a cassette tape, which is then made available for sale to the consumer. As such machines would enable the consumer to produce a single, high quality, compilation of various sound recordings not available on a single cassette tape, proper payment of royalties owed in connection with the compilation of reproductions of the selected sound recordings on a single cassette tape have long been a concern. For this reason, a number of the audio reproduction devices disclosed in the above-cited references are configured to tabulate playbacks for accounting purposes. None, however, are directed to a track playback monitoring system specifically configured for incorporation into a CD type audio reproduction device.

It is, therefore, an object of the present invention to provide a CD type audio reproduction device equipped with a track playback monitoring system.

SUMMARY OF THE INVENTION

The present invention is of an apparatus, and an associated method, for monitoring audio track playbacks by an optical disc audio reproduction device. An optical disc having at least one audio track encoded thereon is loaded into the optical disc audio reproduction device. A track number corresponding to one of the audio tracks encoded on the optical disc is selected using track selection means to initiate playback of the selected audio track by the optical disc audio reproduction device and the selected track number is stored in a first memory device. A series of data signals which define the selected audio track is then read from the optical disc by signal detection means and transmitted to demodulation means where audio and non-audio components of the data signals are separated. The non-audio component of the data signal is then transmitted to processor means where information identifying the optical disc is assembled and transmitted to a second memory device. The contents of the first and second memory devices are then combined in a third, external, memory device to provide a record of audio track playbacks performed by the optical disc audio reproduction device.

In one aspect of the invention, the digital signals transmitted to the demodulation means is comprised of a plurality of data frames, each having an audio data block and a non-audio subcode block containing a single Q subcode data bit included therein. The non-audio subcode block is transmitted to processor means where the single bit of Q data subcode from each frame is assembled into a Q data subcode block. The processor then transmits a portion of the Q data subcode block which identifies the optical disc to the second memory device. Preferably, the optical disc identifying portion of the Q data subcode block is a UPC code. A timing circuit then initiates the transfer of the contents of the first and second memory devices to the third memory device upon detection, by the demodulation means, of a next frame of data after the portion of the Q data subcode block identifying the optical disc is transmitted to the second memory device.

BRIEF DESCRIPTION OF THE DRAWING

The present invention may be better understood, and its numerous objects, features and advantages will become apparent to those skilled in the art, by reference to the accompanying drawing in which.

DETAILED DESCRIPTION OF A PREFERRED EMBODIMENT

Digital data is encoded onto a compact disc (or "CD") in the form of a series of pits, each approximately 0.5 $\mu$m wide, and lands arranged in a track, having a pitch of approximately 1.6 $\mu$m, which extends in a spiral path from the inside to the outside of the surface of the CD. Digital data encoded on the CD is arranged as a series of frames, each containing 291 data bits.

Figure 1:
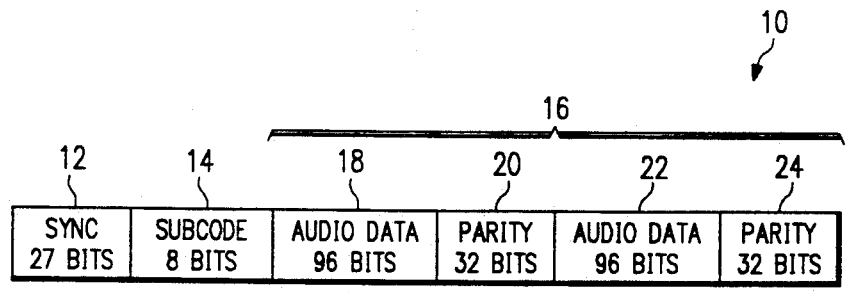
FIG. 1 illustrates a single frame of CD data.

Referring now to FIG. 1, a frame 10 of CD data may now be seen. At the start of each frame 10 is a synchronization block 1 containing 27 synchronization bits for identifying the start of a new frame 12 of CD data being transmitted to a CD player. Following the synchronization block 12 is an 8 bit subcode block 14 which may contain various types of information regarding the CD being played and which will be more fully described below. The subcode block 14 is followed by a data block 16 which may be broken down into a first 96 bit audio data sub-block 18, a first, or "P", 32 bit parity set 20 used for detecting and correcting errors due to lost data bits, a second 96 bit audio data sub-block 22 and a second, or "Q", 32 bit parity set 24 used for determining whether an error has occurred. Each 96 bit audio data sub-block 18, 22 may be further broken down into 12 data bytes, each containing 8 data bits, which alternate between containing audio data for left and right channels of the CD player.

Figure 2:
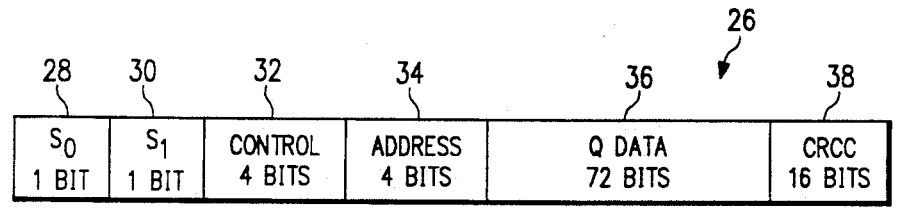
FIG. 2 illustrates a Q channel subcode block which is collected from 98 frames of CD data and which contains Q subcode data.

Referring next to FIG. 2, the Q channel subcode block will now be described in greater detail. The 8 bit subcode block 14 for a frame 10 of CD data includes P, Q, R, S, T, U, V, and W subcode bits. When data frames read off the CD are eight-to-fourteen (or "EFM") demodulated by the CD player, the resultant 8 bit subcode block 14 is propagated to a system microprocessor for the CD player where the P, Q, R, S, T, U, V, and W subcode bits are assembled into corresponding channel subcode blocks. Of these types of channel subcode blocks, only the P and Q channel subcode blocks contain audio-related data. The remaining channel subcode blocks are available for encoding other, non-audio-related, information on an audio CD. For example, so-called CD+G compact discs include video information stored in the non-audio-related channel subcode blocks which may be decoded by an appropriately configured decoder for display by a monitor or other display means. The non-audio channel subcode blocks are, however, infrequently used when encoding CDs.

A Q channel subcode block 26 which is assembled by the system microprocessor of a CD player is illustrated in FIG. 2. The Q channel subcode block 26 includes an "$S_0$" synchronization bit 28, an "$S_1$" synchronization bit 30, a four bit control block 32, a four bit address block 34, a 72 bit Q data block 36 and 16 bit cyclic redundancy check code (or "CRCC") block 38. Synchronization bits $S_0$, $S_1$ identify the start of the Q channel subcode block to the system microprocessor. The four bit control block 32 handles several CD player functions and is configured as set forth in Table I below:

TABLE I

| | |
|---|---|
| Bit 1 = 0 | 2 Channel |
| Bit 1 = 1 | 4 Channel |
| Bit 2 | Undefined |
| Bit 3 = 0 | Copy Deny |
| Bit 3 = 1 | Copy Permit |
| Bit 4 = 0 | Pre-Emphasis OFF |
| Bit 4 = 1 | Pre-Emphasis ON |

As listed in Table I, bit 1 of the control block 32 indicates the number of channels used in recording the encoded audio data and instructs the CD player to switch to either a 2 or 4 channel output. Bit 3 of the control block 32 regulates the ability of other digital recorders to digitally record the encoded audio data. Finally, bit 4 of the control block indicates pre-emphasis and instructs the CD player to switch to the appropriate de-emphasis circuit.

The four bit address block 34 indicates which data mode the 72 bit Q data block 36 is using. An address of 0001 indicates that the Q subcode data block 36 is Mode 1 Q subcode data, address 0010 indicates Mode 2 Q subcode data, and address 0011 indicates Mode 3 Q subcode data. Finally, the 16 bit CRCC block 38 is used by the system microprocessor to detect transmission errors contained in the control, address and Q subcode data blocks 32, 34, 36.

Figure 3A:
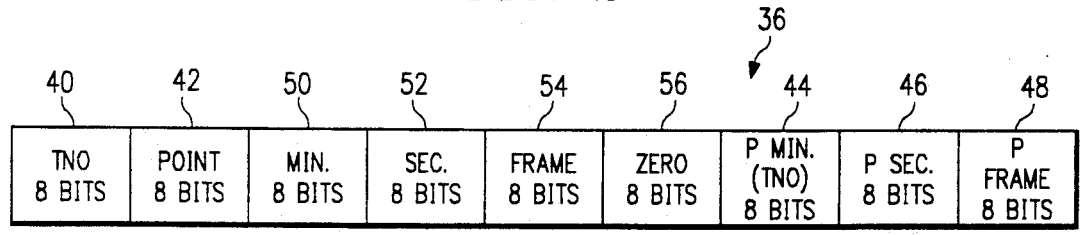
FIG. 3A illustrates a first data mode of Q subcode data which may be contained in the Q channel subcode block of FIG. 2 during a lead-in area of an optical disc.
Figure 3B:
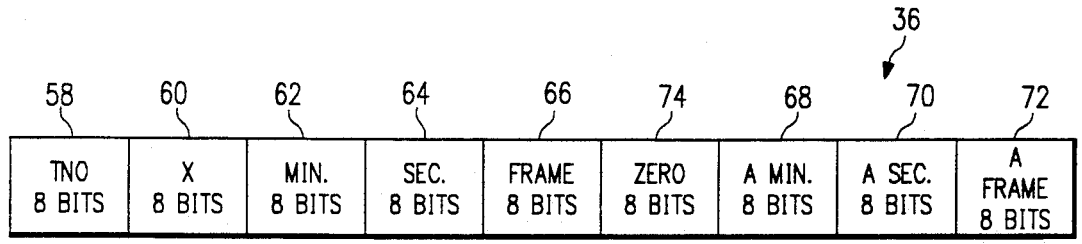
FIG. 3B illustrates a first data mode of Q subcode data which may be contained in the Q channel subcode block of FIG. 2 during program and lead-out areas of an optical disc.

Referring next to FIGS. 3A-B, Mode 1 Q subcode data, which typically occupies at least 9 out of 10 successive subcode blocks, will now be described in greater detail. In its broadest sense, Mode 1 Q subcode data contains number and start times for tracks and is configured differently for the lead-in area of the CD than for the program and lead-out areas of the CD. The configuration of Mode 1 Q data in the lead-in area of the CD is illustrated in FIG. 3A. Mode 1 information is contained in a table of contents (or "TOC"). The TOC stores data indicating the number of music selections up to 99 as a track number (or "TNO") and a starting (or "P") time. The TOC is read by the system microprocessor during disc initialization so that the CD player can respond to any programming or program searching that is requested by the user. In the lead-in area, an 8 bit TNO field 40 is set to 00, indicating that the data is part of a TOC. The TOC is assembled from an 8 bit point field 42 which designates a track number from 0 to 99 and 8 bit P minute, P second and P frame fields 44, 46 and 48 which designate an absolute starting time for the designated track number in minutes, seconds and frames, respectively. When the point field 42 is set to A0, the P minute field 44 indicates the number of the first track on the disc. When the point field 42 is set to A1, the P minute field indicates the number of the last track on the disc and when the point field 42 is set to A2, the absolute running time of the start of the lead-out track is indicated in minutes, seconds and frames by the P minute, P second and P frame fields 44, 46 and 48. Finally, Mode 1 Q subcode data also includes 8 bit minute, second and frame fields 50, 52 and 54, which indicate the time through the lead-in track and an 8 bit zero field 56.

Referring next to FIG. 3B, Mode 1 Q subcode data in the program and lead-out areas will now be described in greater detail. In these areas, Mode 1 Q subcode data contains track numbers in an 8 bit TNO field 58, index (or "X") numbers between 01 and 99 within a track in an 8 bit index field 60, time within a track in 8 bit minute, second and frame time fields 62, 64 and 66 and absolute time for the disc in minute, second and frame absolute time fields 68, 70 and 72 and an 8 bit zero field 74. In the program area, the TNO field 58 designates individual tracks and, in the lead-out area, is set to AA. Running time is set to zero in the time fields 62, 64 and 66 at the beginning of each track and increases towards the end of the track. Absolute time is set to zero in the absolute time fields 68, 70 and 72 at the beginning of the program area and increases to the start of the lead-out area. The X field 60 is used to both subdivide a track as well as to separate it from a successive track. When set to 00, the X field 60 designates a pause between tracks and time fields 62, 64 and 66 are used to perform a countdown to the next track. When set to a non-zero value, the X field 60 sets index points inside a track. Using the X field 60, up to 99 locations within a track can be indexed. Finally, when set to 01, the X field 60 designates a lead-out area.

Figure 4:
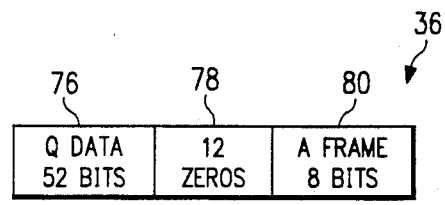
FIG. 4 illustrates a second data mode of Q subcode data which may be contained in the Q channel subcode block of FIG. 2.
Figure 5:
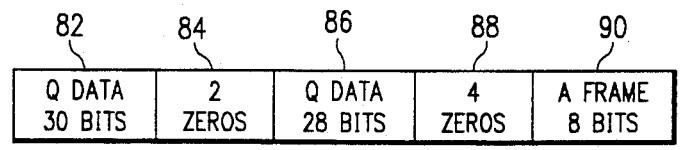
FIG. 5 illustrates a third data mode of Q subcode data which may be contained in the Q channel subcode block of FIG. 2.

Referring next to FIGS. 4 and 5, Mode 2 and Mode 3 Q subcode data will now be described in greater detail. When used, Modes 2 and 3 occupy at least 1 out of 100 successive subcode blocks in the program area and have identical contents in each block. The configuration of Mode 2 Q subcode data is illustrated in FIG. 4. Mode 2 Q subcode data includes a 52 bit Q data field 76, a 12 bit zero field 78 and an 8 bit absolute time field 80. The data field 76 contains a catalog number, for example, a UPC bar code, or other unique disc identifying indicia, for the disc and the absolute time field 80 continues an absolute time count from adjacent blocks.

The configuration of Mode 3 Q subcode data is illustrated in FIG. 5. Mode 3 Q subcode data includes a first, 30 bit, data field 82, a first, two bit, zero field 84, a second, 28 bit, data field 86, a second, four bit, zero field 88 and an 8 bit absolute time field 90. Using 60 bits of data per track, the Mode 3 Q subcode data provides ISRC for identifying each music track on the disc. More specifically, contained in the first, 30 bit, data field 82 are the contents of 5 data bytes. Each of these data bytes is comprised of 6 bits of the data field 82 and the two zero bits of the first zero field 84. Of these, bytes 1 and 2 identify the country code and bytes 3-5 identify the owner code for the disc. Similarly, the contents of 7 data bytes is contained in the second, 28 bit, data field 86. Each of these data bytes is comprised of four bits of the data field 86 and the 4 zero data bits of the second zero field 88. Of these, bytes 6-7 identify the year of the recording and bytes 8-12 identify the serial number of the recording. Similar to Mode 2 Q subcode data, Mode 3 Q subcode data uses the absolute time field 90 to continue an absolute time count from adjacent blocks.

Figure 6:
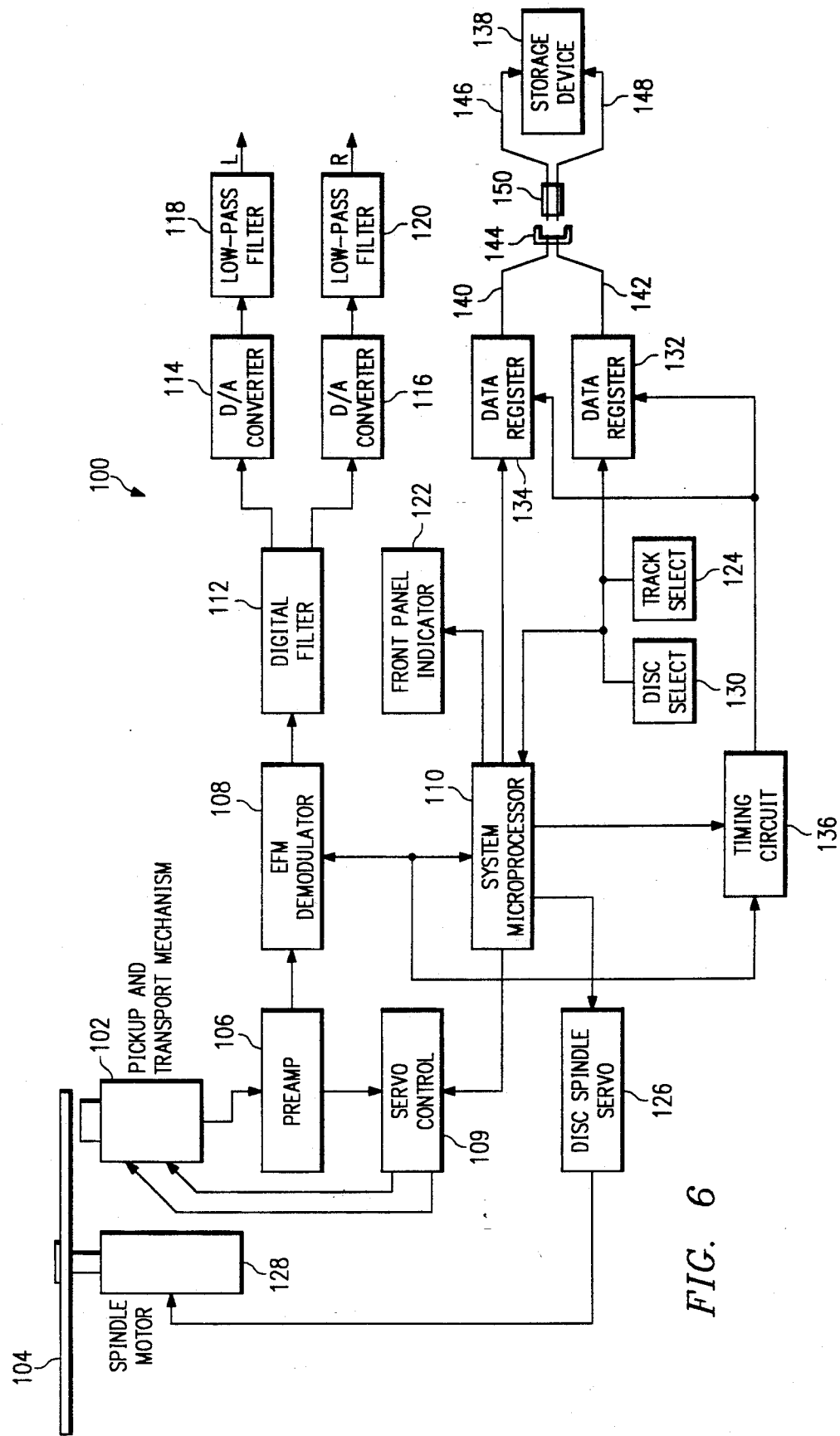
FIG. 6 is a block diagram of a CD player constructed in accordance with the teachings of the present invention and having a track playback monitoring system incorporated therein.

Referring next to FIG. 6, an audio reproduction device, for example, an optical disc reproduction device (or "CD player") 100 constructed in accordance with the teachings of the present invention and having a track playback monitoring system incorporated therein shall now be described in greater detail. The CD player 100 includes a pickup and transport mechanism 102 for reading data encoded on a digital audio medium having at least one audio track digitally encoded thereon, for example, an optical disc (or "CD") 104. Specifically, the pickup and transport mechanism 102 includes a laser diode (or "pickup") assembly mounted on a transport mechanism. The laser diode emits a beam of infrared light that strikes against the pits and lands formed on the CD 104. When the beam reflects off the pits, less light is reflected into a photodetector. As a result, the photodetector receives a sequence of on-off flashes of light which corresponds to the data encoded on the CD 104 in a 14 bit code, commonly referred to as "Eight-to-Fourteen Modulation" or "EFM" signal in which every 8 bits of frame data is encoded on the CD 104 in 14 bits. The EFM signal received by the photodetector is transmitted to a preamplifier 106 which amplifies the received EFM signal and transmits the amplified EFM signal to an EFM demodulator 108. Additionally, the photodetector also provides tracking and focus error signals which are also propagated to the preamplifier 106 for amplification and then transmitted to servo control 109. In turn, the servo control 109 generates control voltages for operating the tracking and focus coils (not shown) of the pickup and transport mechanism 102.

The EFM demodulator 108 decodes the received EFM signal by detecting the synchronization bits marking the beginning of each audio frame and stripping the merging bits from the 14 bit code. Each time the EFM demodulator 108 detects the beginning of an audio frame, the EFM demodulator 108 transmits a signal to a timing circuit 136 to indicate that the start of an audio frame has been detected. The EFM demodulator 108 then takes the EFM signal and reconverts it to its original 8 bit digitized format. After demodulation is completed, the EFM demodulator 108 then separates the subcode portion of each received frame of data for transmission to system microprocessor 110. Conversely, the audio portion of each received frame of data is transmitted to digital filter 112 where the received audio data is broken down into its left and right channel components for respective propagation to D/A converters 114, 116 where the received left and right audio components of the digital audio data are converted into analog audio data by a sample and hold circuit (not shown). Spikes in the left and right analog audio data are removed by low pass filters 118, 120, respectively, and the resultant left and right analog audio signals are then output to audio reproduction equipment (not shown).

When the CD 104 is first inserted into the CD player 100, the CD player 100 initializes the disc by reading data encoded on the lead-in area of the CD 104 which precedes the tracks. The subcode bits encoded on the lead-in area of the CD 104 are stripped from the input digital signal by the EFM demodulator 108 and propagated to the system microprocessor 110 for assembly into a subcode data block such as that illustrated in FIG. 2. During initialization of the CD 104, the Q data subcode block assembled and processed by the system microprocessor 110 is the lead-in Mode 1 Q subcode block illustrated in FIG. 3A. From this block, the system microprocessor 110 is provided with information regarding the CD 104 such as the number and start times of the tracks on the CD 104 so that the system microprocessor 110 can respond to various operator requests such as program searching where a specific track encoded on the CD 104 is selected for playback. The system microprocessor 110 then indicates that initialization is complete and that the CD player 100 is ready to perform playbacks of tracks encoded on the CD 104 by instructing front panel indicator means 122 to display the total playing time of and number of tracks encoded on the CD 104.

Once initialization is complete, the operator may then use the controls of the CD player 100, for example, the track select means 124 to instruct the system microprocessor 110 to initiate a playback of a selected track on the CD 104. The system microprocessor 110 will then instruct the disc spindle servo control 126 to generate a voltage signal which will activate spindle motor 128, thereby initiating rotation of the CD 104, while using the information regarding the disc 104 provided by the EFM demodulator 108 to instruct the servo control 109 to properly position the pickup and transport mechanism 102 to read the selected track from the disc 104. Use of the track select means 124 to select a track for playback also indicates to the system microprocessor 110 that it is now permissible to transfer data to a second data register 134 in a manner to be more fully described below. Additionally, if the CD player 100 is configured to hold multiple CD's for playback, the controls of the CD player 100 may also include disc select means 130 which instruct the system microprocessor 110 to shuffle the CDs loaded in the CD player 100 using disc shuttle means (not shown) so that the selected CD will be positioned for initialization and playback.

When, as previously described, the operator of the CD player 100 initiates the playback of a selected track from the disc 104 using track select means 124, for example, by depressing a number which corresponds to a track on the disc 104 on a numeric keypad, the number identifying the selected track is also propagated to a first data register 132 for storage. As playback of the selected track commences, the EFM demodulator 108 continues to provide the system microprocessor 110 with Q subcode bits for assembly into Q subcode blocks and subsequent processing. As playback of the selected track continues, the system microprocessor 110 will assemble Mode 1, Mode 2 and Mode 3 Q data subcode blocks such as those illustrated in FIG. 3B, 4 and 5, respectively.

When the system microprocessor 110 assembles a Mode 2 Q data subcode block from the subcode bits received from the EFM demodulator 108, the system microprocessor 110 will extract disc identifying information such as a catalog number or UPC bar code, for the CD 104 disc from the data contained in the data field 76. The extracted catalog number is then transmitted to a second data register 134 for storage. Upon transmission of the extracted catalog number to the second data register 134, the system microprocessor 110 will not transmit any further data to the second data register 134 until instructed by the track select means 124 that additional data transfers are acceptable.

Each data register 132, 134 is provided with an output line 142, 140, respectively, connected to a socket-type connector 144 of conventional design, mounted on the exterior surface of the housing of the CD player 100 and used to interconnect the data registers 132, 134 with an external storage device 138, for example, a tape or disk drive. The external storage device 138 has first and second input lines 146, 148, respectively, connected to a plug-type connector 150 of conventional design. When the plug-type connector 150 is inserted in the socket-type connector 144, line 140 is interconnected with line 146 and line 142 is interconnected with line 148, thereby connecting the external storage device 138 with the first and second data registers 132, 134.

When the system microprocessor 110 transmits the disc identifying information to the second data register 134, the system microprocessor 110 also transmits an indication that the disc identifying information has been transferred to the timing circuit 136. When the timing circuit 136 receives, from the EFM demodulator 108, an indication that a next frame of data has been transmitted to the EFM demodulator 108 after the disc identifying information has been stored in the second data register 134, the timing circuit 136 will initiate the propagation of the contents of the data registers 132, 134 to external storage device 138. Preferably, the timing circuit will first instruct the second data register 134 to transfer the disc identifying information stored in the second data register 134 to the external storage device 138 and subsequently instruct the first data register 132 to transfer the track number selected for playback stored in the first data register 132. Preferably, the timing circuit 136 is constructed of combinatorial logic configured in a manner to provide, in succession, the desired output signals to the data registers 134, 132 upon receiving the aforementioned input signals from the system microprocessor 110 and the EFM demodulator 108.

When received by the external storage device 138, the contents of the first data register 132 is appended to the contents of the second data register 134 to form a single data block which uniquely identifies the CD track selected for playback by the CD player 100. As successive tracks are selected for playback using the track select means 124, the storage device 138 will accumulate data blocks identifying each CD track selected for playback. This data may be accessed at any time to monitor the selected playbacks in connection with royalty calculations or other management functions.

Thus, there has been described and illustrated herein a CD player configured to monitor the CD tracks selected for playback and to accumulate data which uniquely identifies each selected CD track for output to an external storage device. Those skilled in the art, however, will recognize that many modifications and variations besides those specifically mentioned may be made in the techniques described herein without departing substantially from the concept of the present invention. For example, it is contemplated that the present invention may be readily adapted to monitor the tracks selected for playback from a digital audio tape recording (or "DATR"). Accordingly, it should be clearly understood that the form of the invention as described herein is exemplary only and is not intended as a limitation of the scope of the invention.

What is claimed is:

1. Apparatus for reproducing audio signals encoded on optical discs as audio tracks and monitoring playbacks of said audio tracks encoded on said optical discs by said apparatus, comprising:

signal detection means for detecting data signals encoded on an optical disc as a collection of numbered audio tracks, said encoded data signals corresponding to each of said audio tracks having an audio data component and a non-audio data component which contains information identifying said optical disc;

track selection means for selecting one of said audio tracks encoded on said optical disc for playback;

first memory means electrically connected to said track selection means, said first memory means storing a number corresponding to said audio track selected with said track selection means;

servo control means electrically connected to said track selection means, said servo control means positioning said signal detection means and rotating said optical disc in response to selection of one of said audio tracks by said track selection means such that said signal detection means reads said encoded data signals corresponding to said selected audio track;

demodulation means for separating said audio and non-audio data components of said encoded data signal detected by said signal detection means;

second memory means for storing said information identifying said optical disc contained in said non-audio data component;

said audio data component separated by said demodulation means being transmittable to a sound system for audible reproduction of said selected audio track and said information identifying said optical disc contained in said non-audio data component separated by said demodulation means being transmitted to said second memory means; and third memory means for storing, for each optical disc track selected by said track selection means, said number stored in said first memory means by said track selection means and said information identifying said optical disc stored in said second memory means by said demodulation means.

2. An apparatus for reproducing audio signals and monitoring audio track playbacks according to claim 1 wherein each of said audio tracks encoded on said optical disc and detected by said signal detection means is comprised of a plurality of data frames, each said frame of data comprised of an audio data block and at least one non-audio data bit, and further comprising processor means, connected to said demodulation means, for assembling said at least one non-audio data bit for successive data frames into a non-audio data block containing said information identifying said optical disc.

3. An apparatus for reproducing audio signals and monitoring audio track playbacks according to claim 2 wherein a first portion of said non-audio data block contains said information identifying said optical disc and wherein said processor means further comprises means for transmitting only said first portion of said non-audio block to said second memory means.

4. An apparatus for reproducing audio signals and monitoring audio track playbacks according to claim 2 wherein said frame of data is comprised of an audio data block and one Q subcode data bit and wherein said processor means further comprises means for assembling said one Q subcode data bit from each frame of data into a Q subcode data block.

5. An apparatus for reproducing audio signals and monitoring audio track playbacks according to claim 4 wherein said processor means further comprises:

means for extracting a UPC code for said optical disc from said Q subcode data block; and means for transmitting said extracted UPC code identifying said optical disc to said second memory means.

6. An apparatus for reproducing audio signals and monitoring audio track playbacks according to claim 5 and further comprising a timing circuit for clocking the contents of said first and second memory means into said third memory means upon propagation of a next data frame to said demodulation means after storage of said number corresponding to said selected audio track in said first memory means and storage of said extracted UPC code identifying said optical disc in said second memory means.

7. An apparatus for reproducing audio signals and monitoring audio track playbacks according to claim 6 wherein said third storage means further comprises means for assembling said extracted UPC code received from said second memory means and said number corresponding to said selected audio track received from said first memory means into a data block which identifies each audio track selected for playback using said optical disc audio reproduction system.

8. Apparatus for reproducing audio signals encoded on optical discs as audio tracks and monitoring playbacks of said audio tracks encoded on said optical discs by said apparatus, comprising:

signal detection means for detecting data signals encoded on an optical disc as a collection of numbered audio tracks, each said audio track comprised of a plurality of data frames and each said frame of data comprised of an audio data block and at least one non-audio data bit;

track selection means for selecting one of said audio tracks encoded on said optical disc for playback;

first memory means having an input electrically connected to said track selection means and an output, said first memory means storing a number corresponding to said audio track selected with said track selection means;

processor means having first and second inputs and first and second outputs, said first input electrically connected to said track selection means for receiving said number corresponding to said audio track selected thereby;

servo control means electrically connected to said first output of said processor means, said servo control means controlling the positioning of said signal detection means and the rotating of said optical disc in response to selection of one of said audio tracks by said track selection means such that said signal detection means reads said encoded data signals corresponding to said selected audio track;

demodulation means for separating said audio and non-audio data components of said encoded data signal detected by said signal detection means, said audio data component separated by said demodulation means being transmittable to a sound system for audible reproduction of said selected audio track;

said processor means further comprising means for assembling said at least one non-audio data bit for successive data frames into a non-audio data block containing said information identifying said optical disc;

second memory means having an input connected to a first output of said processor means and an output, said information identifying said optical disc contained in said assembled non-audio data block being transmitted to said second memory means; and a connector socket plug having first and second contacts connected to said outputs of said first and second memory means, respectively;

a timing circuit for clocking the contents of said first and second memory means to said first and second inputs of said connector plug upon detection, by said demodulation means, of a next data frame after storage of said number corresponding to said selected audio track in said first memory means and storage of said non-audio data block identifying said optical disc in said second memory means;

wherein an external storage device having connector plug means insertably mounted in said connector socket will receive the contents of said first and second memory means for storage therein, thereby proving a record of audio tracks playbacks performed by said optical disc audio reproduction device.

9. An apparatus for reproducing audio signals and monitoring audio track playbacks according to claim 8 wherein said frame of data is comprised of an audio data block and one Q subcode data bit and wherein said processor means further comprises means for assembling said one Q subcode data bit from each frame of data into a Q subcode data block.

10. An apparatus for reproducing audio signals and monitoring audio track playbacks according to claim 9 wherein said processor means further comprises:

means for extracting a UPC code for said optical disc from said Q subcode data block; and means for transmitting said extracted UPC code identifying said optical disc to said second memory means.

11. A method for monitoring audio track playbacks by an optical disc audio reproduction device, comprising the steps of:

loading an optical disc having at least one audio track encoded thereon into an optical disc audio reproduction device, each said audio track having a track number assigned thereto;

selecting a track number corresponding to one of said audio tracks encoded on said optical disc to initiate playback of said selected audio track by said optical disc audio reproduction device;

storing said track number in a first memory device;

reading said selected audio track from said optical disc, said selected audio track having a non-audio code incorporated therein for identifying said optical disc;

storing said non-audio code read from said selected audio track in a second memory device;

combining, in a third memory device, said track number and said non-audio optical disc identification code to provide a record of audio track playbacks performed by said optical disc audio reproduction device.

12. A method for monitoring audio track playbacks by an optical disc audio reproduction device according to claim 11 wherein the step of reading said selected audio track from said optical disc further comprises the steps of:

optically detecting a pattern of pits and lands formed on said optical disc, said series of pits and lands comprising said selected audio track;

producing a digital signal corresponding to said pattern of detected pits and lands; and separating said digital signal into an audio portion for transmission to sound generation equipment and a non-audio portion for transmission to a processor, said non-audio portion of said digital signal containing said non-audio code identifying said optical disc.

13. A method for monitoring audio track playbacks by an optical disc audio reproduction device according to claim 12 wherein said digital signal is comprised of a plurality of data frames, each said data frame having an audio data block and a non-audio subcode block having a single Q data bit, and further comprising the steps of:

assembling said single Q data bit from each frame into a Q data subcode block; and separating said non-audio code identifying said optical disc from said Q data subcode block.

14. A method for monitoring audio track playbacks by an optical disc audio reproduction device according to claim 13 wherein said non-audio code identifying said optical disc in said Q data subcode block is a UPC code.

15. A method for monitoring audio track playbacks by an optical disc audio reproduction device according to claim 13 and further comprising the steps of:

transmitting said track number stored in said first memory device and said non-audio Q data subcode identifying said optical disc stored in said second memory device to said third memory device upon transmission of a next data frame for separation into audio and non-audio data blocks.

16. A method for monitoring audio track playbacks by an optical disc audio reproduction device according to claim 15 and further comprising the step of transmitting, in sequence, said non-audio Q data subcode identifying said optical disc stored in said second memory device, followed by said track number stored in said first memory device, to said third memory device.

17. A method for monitoring audio track playbacks by an optical disc audio reproduction device according to claim 16 wherein said non-audio code identifying said optical disc in said Q data subcode block is a UPC code.

18. A method for monitoring audio track playbacks by an audio reproduction device, comprising the steps of:

loading a digital audio medium having at least one audio track digitally encoded thereon into an audio reproduction device, each said audio track having a track number assigned thereto;

selecting a track number corresponding to one of said audio tracks encoded on said digital audio medium to initiate playback of said selected audio track by said audio reproduction device;

storing said track number in a first memory device;

reading said selected audio track from said digital audio medium, said selected audio track having a non-audio code incorporated therein for identifying said digital audio medium; selected audio track in a second memory device;

combining, in a third memory device, said track number and said non-audio digital audio medium identification code to provide a record of audio track playbacks performed by said audio reproduction device.

19. A method for monitoring audio track playbacks by an audio reproduction device according to claim 18 wherein the step of reading said selected audio track from said digital audio medium further comprises the steps of:

producing a digital signal corresponding to said digitally encoded audio track; and separating said digital signal into an audio portion for transmission to sound generation equipment and a non-audio portion for transmission to a processor, said non-audio portion of said digital signal containing said non-audio code identifying said digital audio medium.

* * * * *